US009489151B2

(12) United States Patent
El-Batal

(10) Patent No.: US 9,489,151 B2
(45) Date of Patent: Nov. 8, 2016

(54) SYSTEMS AND METHODS INCLUDING AN APPLICATION SERVER IN AN ENCLOSURE WITH A COMMUNICATION LINK TO AN EXTERNAL CONTROLLER

(71) Applicant: NetApp, Inc., Sunnyvale, CA (US)

(72) Inventor: Mohamad El-Batal, Superior, CO (US)

(73) Assignee: NETAPP, INC., Sunnyvale, CA (US)

( * ) Notice: Subject to any disclaimer, the term of this patent is extended or adjusted under 35 U.S.C. 154(b) by 448 days.

(21) Appl. No.: 13/901,333

(22) Filed: May 23, 2013

(65) Prior Publication Data
US 2014/0351507 A1 Nov. 27, 2014

(51) Int. Cl.
*G06F 3/00* (2006.01)
*G06F 3/06* (2006.01)

(52) U.S. Cl.
CPC ........... *G06F 3/0689* (2013.01); *G06F 3/0619* (2013.01); *G06F 3/0658* (2013.01); *G06F 3/0665* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 7,437,462 | B2* | 10/2008 | Marks | G06F 3/0605 709/224 |
| 8,595,397 | B2* | 11/2013 | Dekoning | G06F 3/0607 710/306 |
| 2003/0221061 | A1 | 11/2003 | El-Batal et al. | |
| 2004/0153914 | A1 | 8/2004 | El-Batal | |
| 2005/0057898 | A1 | 3/2005 | El-Batal et al. | |
| 2005/0057909 | A1 | 3/2005 | El-Batal et al. | |
| 2005/0071546 | A1 | 3/2005 | Delaney et al. | |
| 2005/0144268 | A1 | 6/2005 | El-Batal et al. | |
| 2005/0188118 | A1 | 8/2005 | Richardson et al. | |
| 2005/0235080 | A1 | 10/2005 | El-Batal | |
| 2005/0240825 | A1 | 10/2005 | El-Batal | |
| 2005/0250533 | A1 | 11/2005 | El-Batal et al. | |
| 2005/0250555 | A1 | 11/2005 | Richardson et al. | |
| 2007/0124407 | A1 | 5/2007 | Weber et al. | |
| 2007/0217141 | A1 | 9/2007 | El-Batal et al. | |
| 2008/0126700 | A1 | 5/2008 | El-Batal et al. | |
| 2008/0162987 | A1 | 7/2008 | El-Batal | |
| 2008/0209099 | A1 | 8/2008 | Kloeppner et al. | |
| 2010/0064169 | A1 | 3/2010 | Davies et al. | |

(Continued)

OTHER PUBLICATIONS

PCT—International Searching Authority, Notification of Transmittal of the International Search Report and the Written Opinion of the International Searching Authority, or the Declaration mailed Aug. 11, 2014, Application No. PCT/US2014/031256, 9 pages, Alexandria, Virginia.

(Continued)

*Primary Examiner* — Idriss N Alrobaye
*Assistant Examiner* — Richard B Franklin
(74) *Attorney, Agent, or Firm* — Haynes and Boone, LLP

(57) ABSTRACT

A system including a first array of storage drives in communication with a storage controller, the storage controller providing virtualized storage with the first array of storage drives; an application server running a storage warehouse application and communicatively coupled to a host device and the storage controller; and a communication port expander providing expansion slots to a first enclosure, wherein the first array of storage drives, the application server, and the communication port expander are contained in the first enclosure separate from the controller, further wherein the controller controls the first array of storage drives and is in communication with the first array of storage drives through the communication port expander.

6 Claims, 10 Drawing Sheets

(56) References Cited

U.S. PATENT DOCUMENTS

| | | |
|---|---|---|
| 2010/0153620 A1 | 6/2010 | McKean et al. |
| 2010/0200523 A1 | 8/2010 | Henderson |
| 2010/0257301 A1 | 10/2010 | Kloeppner et al. |
| 2010/0312964 A1 | 12/2010 | DeKoning et al. |
| 2010/0318711 A1 | 12/2010 | Weber et al. |
| 2011/0083992 A1 | 4/2011 | Stahlsatz et al. |
| 2011/0185099 A1 | 7/2011 | Stahlsatz et al. |
| 2011/0202728 A1 | 8/2011 | Nichols et al. |
| 2011/0231674 A1 | 9/2011 | Stahlsatz et al. |
| 2011/0238938 A1 | 9/2011 | Kloeppner et al. |
| 2012/0185643 A1 | 7/2012 | Dekoning et al. |
| 2013/0050955 A1 | 2/2013 | Shinsato et al. |
| 2013/0097376 A1 | 4/2013 | Hall et al. |

OTHER PUBLICATIONS

Supermicro, Supermicro 2U Twin solutions, www.subermicro.com/products/nfo/2UTwin.cfm, accessed May 14, 2013, 3 pgs.

Intel, Intel Server System SR1600 and SR2600 Family Product Brief, www.intel.com/contenUwww/us/e/servers/server-system-sr1600-and-sr2600-family, Accessed May 13, 2013, 10 pages.

Intel, Intel® Server System SR2612UR, www.intel.com/content/www/us/e/servers/server-Systemsr2612ur.html, accessed May 13, 2013, 3 pages.

* cited by examiner

US 9,489,151 B2

SYSTEMS AND METHODS INCLUDING AN APPLICATION SERVER IN AN ENCLOSURE WITH A COMMUNICATION LINK TO AN EXTERNAL CONTROLLER

TECHNICAL FIELD

The present description relates to network storage systems and, more specifically, to systems and methods in which application server hardware and software are included with communication links to a storage array controller in a separate enclosure.

BACKGROUND

Conventional network storage systems may be implemented using the Storage Bridge Bay standard. The Storage Bridge Bay (SBB) specification is a standard for storage solution providers who desire to have a standard controller and slot compatibility between respective controllers which can be manufactured by different organizations. The SBB specification describes the physical requirements for storage canisters and the mid-plane connectors of a storage enclosure. The storage enclosure can house one or more storage canisters. Meanwhile, each storage canister houses at least one printed circuit board having electronics mounted thereon. A current version of the SBB specification, as of this writing, is Storage Bridge Bay Specification, Version 2.0 released Jan. 28, 2008, the entire contents of which are hereby incorporated by reference.

Storage enclosures are conventionally designed to fit in a standard rack defined in EIA-310. A rack unit (or "U") is a measurement of height within the rack, where one rack unit equals 44.45 mm or 1.75 inches. A storage or computing device that is embodied within an enclosure that it is one rack unit tall may be referred to as a "1 U" device. Similarly, a storage or computing device that is embodied in an enclosure that is two rack units tall may be referred to as a 2 U device. A given rack can be any height, but is usually 19 or 23 inches tall.

A conventional network application system includes two application servers in different 2 U enclosures, a RAID Bunch of Drives (RBOD) in a 2 U enclosure, and an Expansion Bunch of Drives (EBOD) in a 2 U enclosure, for a total of 8 U taken up by four enclosures. The RBOD includes two storage controllers, and the EBOD includes two expansion Enclosure Service Modules (ESMs). However, conventional techniques for configuring a network storage system may not be as efficient as could be desired.

BRIEF DESCRIPTION OF THE DRAWINGS

The present disclosure is best understood from the following detailed description when read with the accompanying figures.

DETAILED DESCRIPTION

Figure 1:
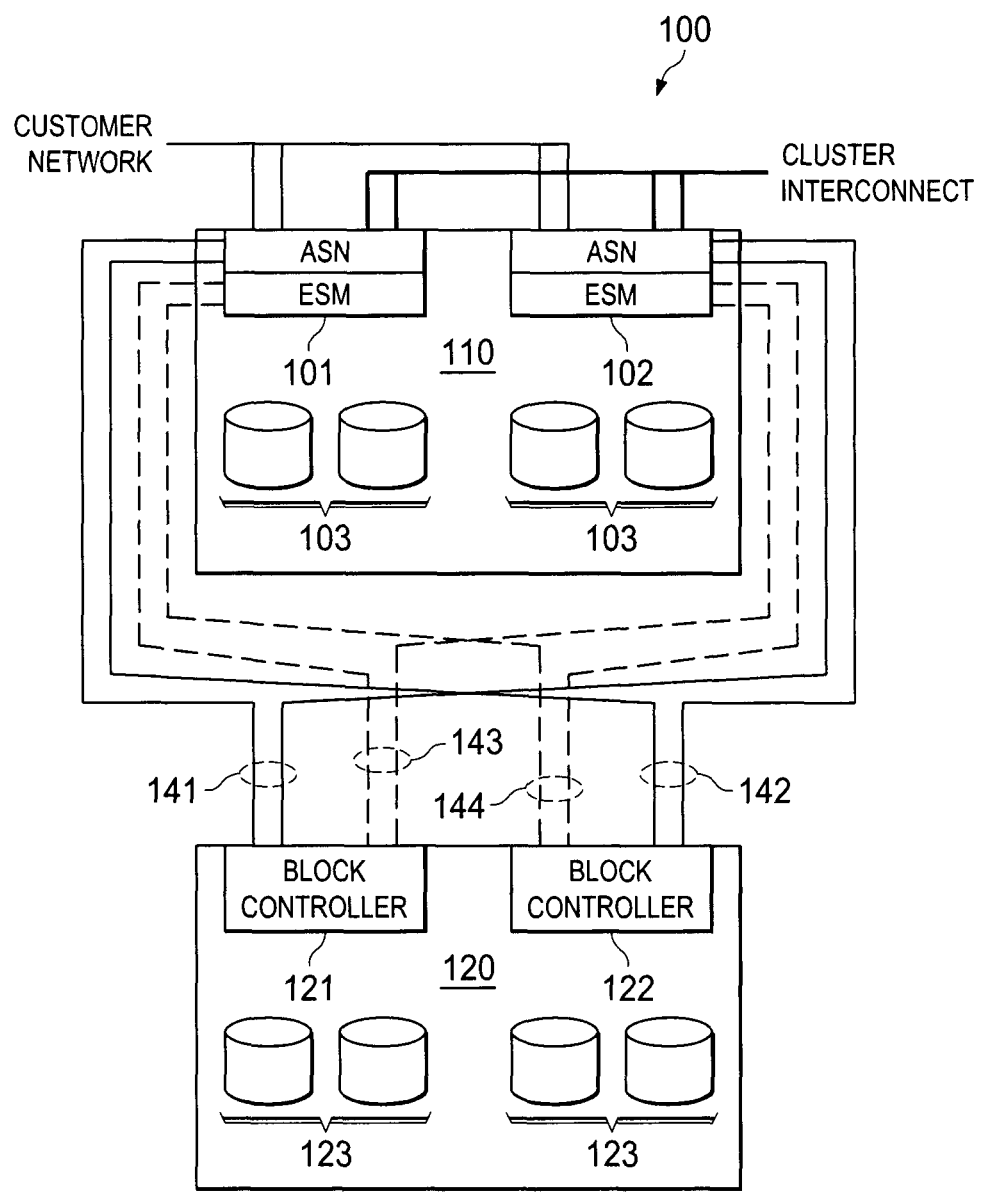
FIG. 1 is a system diagram of a computing infrastructure including a network storage system according to aspects of the present disclosure.

All examples and illustrative references are non-limiting and should not be used to limit the claims to specific implementations and embodiments described herein and their equivalents. The headings are solely for formatting and should not be used to limit the subject matter in any way, because text under one heading may cross reference or apply to text under one or more headings. Finally, in view of this disclosure, particular features described in relation to one aspect or embodiment may be applied to other disclosed aspects or embodiments of the disclosure, even though not specifically shown in the drawings or described in the text.

The present disclosure relates to network storage systems and methods of implementing network storage systems that provide for more efficient use of space in a computer housing (e.g., a rack). In one example, a network storage system includes an Application Server Node (ASN) in a same enclosure with an ESM, where the ESM includes expansion ports. The enclosure also includes a first array of storage drives. A different enclosure includes a storage controller providing virtualized storage functionality for the array of storage drives. The storage controller communicates with the array of storage drives via the expansion ports of the ESM.

Thus, in this example, even though the array of storage drives is located in the same enclosure as the ASN, it is not the processing power of the ASN that it used as a storage controller. Rather, the storage controller functionality is provided by a storage controller in a separate RBOD enclosure that takes advantage of the expansion ports of the ESM to communicate with the storage array.

In one example, the enclosure that includes the storage controller also includes another array of storage drives that are also controlled by the storage controller. The first enclosure and the second enclosure each occupy 2 U in the rack, thereby providing a 4 U storage system. By contrast, a conventional network storage system would use separate enclosures for an ASN and an ESM, thereby using more units in the rack.

In another example, an enclosure includes a High Availability (HA) pair of ASNs, each of the ASNs including an ESM with expander ports. The enclosure may be still be embodied as a 2 U enclosure. The space savings may be achieved by embodying the ESMs as Peripheral Component Interconnect Express (PCIe) cards that occupy card slots of the ASN hardware. However, the scope of embodiments is not limited to PCIe cards as ESMs, as any appropriate connection between the ASN hardware and the ESM hardware may be used.

The block controllers may also be embodied as an HA pair, where each block controller is redundantly connected to each ASN and to each ESM. In fact, the architecture described herein may be adapted for use in clustered systems, as shown in the figures.

In yet another example, the ASN is embodied as a dense server, which has two or more processors and may use more room on a circuit board than a server that has only one processor. An example of a dense server is one that uses two or four Intel™ Xeon™ processors, though the scope of embodiments is not limited to any particular type or number of processors. In some embodiments employing dense servers as ASNs, there may not be enough space within a 2 U enclosure to house two or more redundant ASNs. Thus, some dense server embodiments may include only one ASN in a given enclosure, along with at least one ESM. Redundancy can then be achieved by using an additional ASN/ESM enclosure and making redundant connections between the storage controller and each of the ASNs.

The various embodiments described above are examples, and it is understood that the scope of embodiments includes storage systems with different numbers of controllers, ASNs, and storage arrays. In fact, any of the embodiments described herein may be scaled larger or smaller depending on particular needs of a given implementation.

FIG. 1 is a system diagram of a computing infrastructure 100 including a network storage system according to aspects of the present disclosure. Infrastructure 100 includes enclosure 110 and enclosure 120, which may be adapted according to the EIA-310 standard to fit into standard racks. However, the scope of embodiments is not limited to standard enclosures, and any type of enclosure, whether standard or otherwise, may be adapted for use in some embodiments.

Enclosure 100 includes circuit boards 101 and 102, as well as storage array 103. In this example, circuit board 101 includes hardware and software to provide ASN and ESM functionality, as does circuit board 102. The ASNs of circuit boards 101 and 102 are configured as a HA pair.

The ASNs of circuit boards 101 and 102 are in communication over the customer network with one or more host devices (not shown). The ASNs of circuit boards 101 and 102 are also in communication with a cluster interconnect, which may provide communication with other devices in a cluster (e.g., additional ASNs, not shown). Connections to the customer network and cluster interconnect may include Ethernet, Infiniband, IEEE 802.11, and/or any other appropriate communication link.

The ASNs of FIG. 1 host storage applications that are made available to host systems that access to the storage system. For example, some ASNs run applications to provide: continuous data protection through automated backup procedures, database management application processes, snapshot management processes, the de-duplication management processes, and the like. Other examples of applications include a cluster-based file system program (e.g., a Lustre™ application), a high-performance computing application (a data warehousing application, a video delivery and processing application, an Oracle™ database application, etc.), a big data application (e.g., Hadoop™ or other map-reduce application), and the like.

In some examples, the ASNs utilize Virtual Machine Managers (commonly referred to as "hypervisors") to provide a virtual machine for each of the multiple application processes. In general, a hypervisor controls the overall operation of each of a plurality of virtual machines. Each virtual machine may include its own specific operating system kernel and associated application processes such that the hypervisor hides the underlying physical hardware circuitry interfaces from the operating system and application processes operating within a virtual machine.

The ASNs of FIG. 1 may use any appropriate operating system or hypervisor, but in this example, the ASN may include one or more general purpose processors (e.g., Intel Xeon or other processors) running a data warehousing program (e.g., a map reduce program) on top of Linux.

The ESMs of FIG. 1 include hardware and software functionality to manage the physical operation of hardware within the storage system. Examples of functionality include environment reporting and setting via SCSI enclosure services, such as temperature control, power management, and the like. The ESMs may include their own processing power and memory suitable to provide such functionality (e.g., by an Application Specific Integrated Circuit or Field Programmable Gate Array), and in many instances, the amount of processing power and memory used in an ESM is less than that used in an application server.

Further, in this example, the ESMs of FIG. 1 include expander ports for connecting further devices within the cluster. Before discussing the expander ports further, a discussion of the data transfer links may be instructive. System 100 may be implemented with serial attached SCSI (SAS) architecture or a like architecture suitable for supporting full duplex data transfer. SAS may refer to a point to point serial interface suitable for providing full duplex communication at three, six, or twelve gigabits per second (Gb/s) or higher per direction per channel. Protocols that may communicate via a SAS interface may be small computer system interface (SCSI), advanced technology attachment (ATA), SAS management or like protocols.

Expander devices included in the ESMs of FIG. 1 may include edge expander devices, edge expander device sets, and fanout expanders. SAS devices, such as end devices and expander devices, may be interconnected to deliver scalable storage in a SAS environment. SAS devices are typically interconnected with a set of point-to-point links in the SAS domain. SAS devices may also include at least two connections for enhanced performance and availability. In an interconnection of SAS devices or SAS domain, each logical connection to a node is made via a port. A port may include a plurality of point-to-point links, which may be denoted as phys. For instance, a typical media device, such as a storage drive, may comprise two ports with each port including at least one phy. Additionally, multiple phys may be arranged together to make up a port, allowing for multiple concurrent connections to be established. In some embodiments, the expanders included in the ESMs of FIG. 1 include edge expander devices or like expander devices suitable for communication with up to 128 SAS addresses. An edge expander device enables communication to be established between nodes that are directly connected to the edge expander device.

Nevertheless, as mentioned above, the scope of embodiments is not limited to SAS. Other suitable data transfer links may be appropriate, such as Fibre Channel (FC), Ethernet, Infiniband, IEEE 802.11, and the like.

Moving to enclosure 120, block controllers 121 and 122 are embodied in circuit boards housed within enclosure 120 along with storage drive array 123. Block controllers 121 and 122 in this example are configured as a HA pair, though the scope of embodiments is not limited just to HA pairs.

Each controller 121, 122 includes one or more processors or application specific logic that causes connected storage arrays to read or write data to or from persistent storage in response to requests received from an external host. Each controller 121, 122 may also include memory that acts as a buffer or temporary storage for data being transferred between the host and persistent storage. Each controller 121, 122 may further include host input/output (I/O) controllers (HICs) that interface the storage array controller with the host, and target I/O controllers (TICs) that interface the storage array controller with the storage drives. The block controllers 121, 122 may include processing power and memory suitable to virtualize storage and control reads and writes (e.g., by an Application Specific Integrated Circuit or Field Programmable Gate Array), and in many instances, the amount of processing power and memory used in a block controller 121, 122 is less than that used in an application server.

In one example, each block controller 121, 122 virtualizes the storage within storage arrays 103, 123 to provide RAID storage. The acronym "RAID" is an umbrella term for computer data-storage schemes that can divide and replicate data among multiple physical storage drives. When several physical storage drives are set up to use RAID technology, the storage drives are said to be in a RAID array. The RAID array distributes data across several storage drives, but the array is exposed to the operating system at the application server as a single logical storage drive or multiple logical storage drives, where the logical storage drives do not correspond one-to-one with the physical storage drives. Examples of storage drives that may be used in various embodiments include Solid State Drives (SSDs), Hard Disk Drives (HDDs), and the like.

Figure 10:
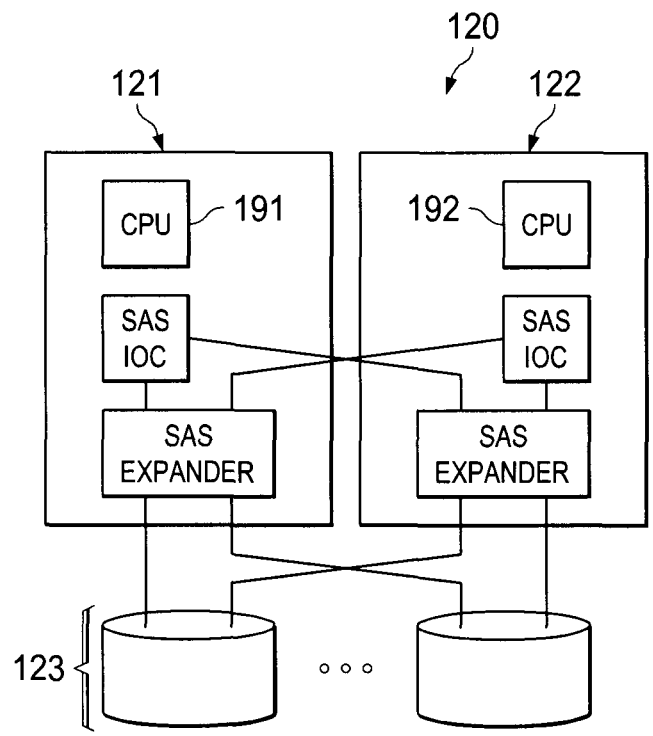
FIG. 10 is an illustration of an example RBOD, adapted according to one embodiment.

Enclosure 120 may be referred to as a RAID Bunch of Drives or (RBOD). In one example, block controllers 121, 122 are essentially identical storage controllers coupled with one another to provide redundancy in case of failure of one. FIG. 10 provides a more detailed illustration of RBOD 120 according to one embodiment. In FIG. 10, controller 121 has a circuit board 191 with a CPU, an SAS I/O controller, and an SAS expander. Similarly, controller 122 has a circuit board 192 with a CPU, an SAS I/O controller, and a SAS expander. The controllers 121, 122 are cross-coupled via their SAS I/O controllers. Further, each of the storage drives in array 123 is communicatively coupled to each controller 121, 122. Each of the RBODs shown in the various embodiments herein may include cross-coupled controllers, as shown in FIG. 10. In the exemplary embodiment of FIG. 2, block controllers 121, 122 are interconnected via a path (not shown), which may provide any of a variety of well-known communication protocols and media including, for example, PCI (e.g., PCI Express), SAS, Fibre Channel, Infiniband, Ethernet, IEEE 802.11, etc. This inter-controller interface and medium is utilized for exchanges between the controllers 121, 122 within the storage enclosure 120.

The various components of system 100 are communicatively coupled as follows. Block controller 121 is connected to the ASNs of circuit boards 101 and 102 via communication link 141. Thus, block controller 121 is connected to both ASNs. Similarly, block controller 122 is connected to the ASNs via communication links 142. Communication links 141 and 142 may include any appropriate type of communication link, including but not limited to SAS, Fibre Channel, Infiniband, Ethernet, IEEE 802.11, and the like.

Block controller 121 is connected to the ESMs of circuit boards 101 and 102 via communication links 143. Thus, block controller 121 is connected to both of the redundant ESMs in enclosure 110. Similarly, block controller 122 is connected to the ESMs by communication links 144. Communication links 143 and 144 may include any appropriate type of communication link, including but not limited to SAS, Fibre Channel, Infiniband, Ethernet, IEEE 802.11, and the like.

Block controllers 121 and 122 communicate with, and control, storage drive array 123 through a midplane interface (not shown) or other interface within enclosure 120. Furthermore, block controllers 121, 122 communicate with, and control, storage drive array 103 (in enclosure 110) via communication links 143, 144 and the EMS. In other words, storage drive array 103 in enclosure 110 is in communication with controllers 121, 122, which are external to enclosure 110, through the ESMs that are included within enclosure 110.

The embodiment shown in FIG. 1 may provide one or more advantages over conventional network storage systems. Combining ASN and ESM hardware into the same enclosure may provide space savings by creating higher density of storage drives. Thus, the ratio of number of rack units used for storage versus the number of rack units used for processing can be increased. Increasing such ratio may be desirable because, as processing power increases, the ability to control storage drive arrays using a same size circuit board also increases; but as the number of rack units for storage increases, there is less space for processing power in the rack.

Figure 2:
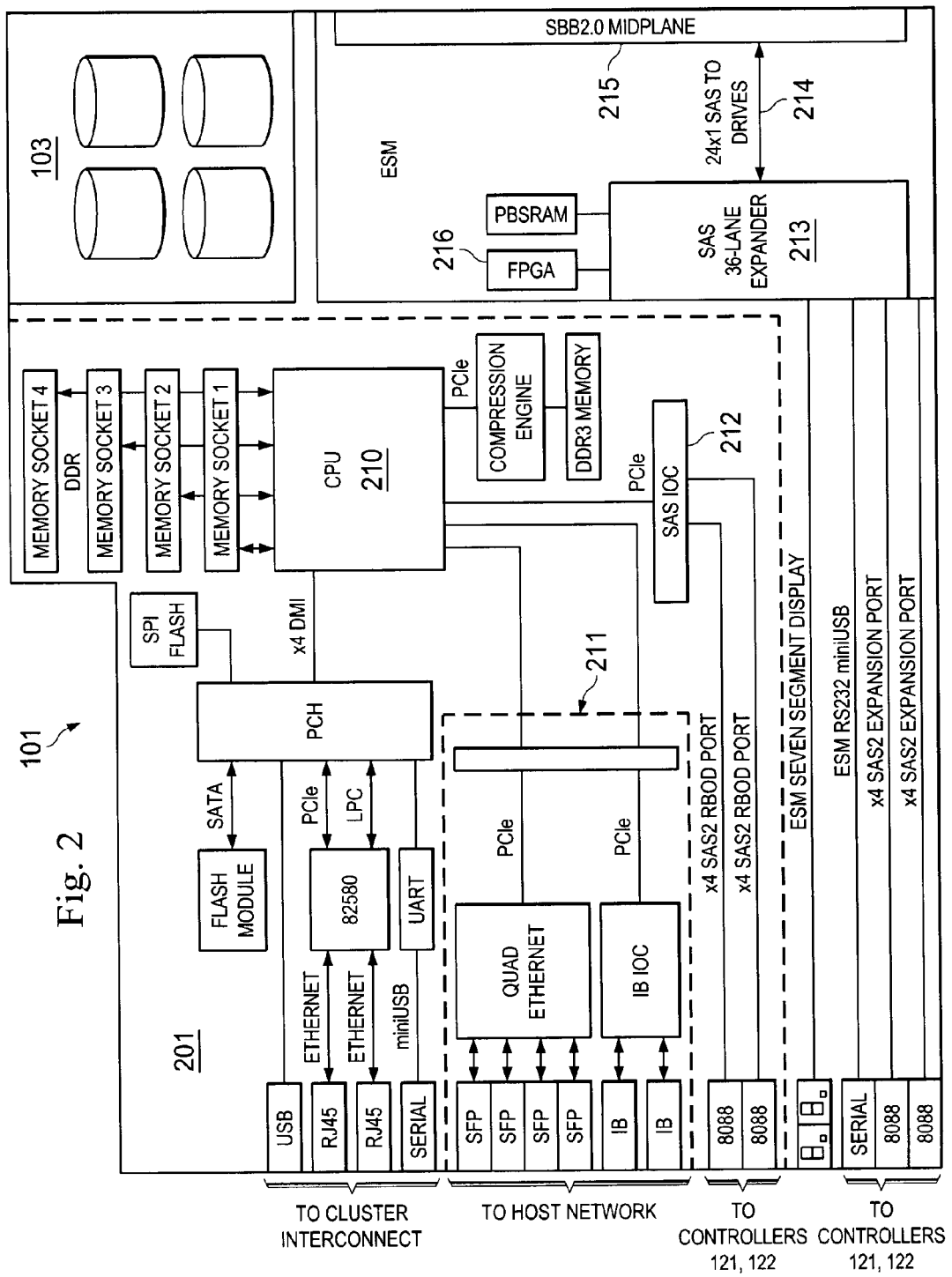
FIG. 2 is an illustration of an example circuit board of FIG. 1, adapted according to one embodiment.

FIG. 2 is an illustration of an example circuit board 101 of FIG. 1, adapted according to one embodiment. It is understood that in various embodiments, system 100 (FIG. 1) may include circuit board 102, which is substantially similar to circuit board 101. It should also be noted that the specific implementation shown in FIG. 2 is an example, and other embodiments with different types and numbers of I/O ports, processing power, memory, and the like may be adapted for use. In one example, the hardware of a RAID controller may be used as the hardware of circuit board 101. For instance, if a RAID controller board has sufficient processing hardware, its RAID controller software and firmware may be replaced with application server hardware and firmware to provide application server functionality in any of the embodiments of FIG. 1, 6, or 7. In other words, the embodiment of FIG. 2 shows a modified RAID controller board used as an ASN. However, any appropriate processing hardware may be used in any of the embodiments.

Dashed line 201 shows a division between the ASN hardware and the ESM hardware. Labels to the left side of circuit board 101 show that some ports communicate with the cluster interconnect, the host network, and the controllers 121 and 122. Among other things the ASN hardware includes CPU 210, HIC card 211, and SAS input/output control 212 (to communicate with controllers 121 and 122).

The ESM hardware can be embodied as a PCIe card, mounted directly on board 101, or any other appropriate configuration. Among other things, the ESM hardware includes expander 213, which provides ports for communication with controllers 121 and 122. The communication with controllers 121 and 122 is passed through connection 214 to midplane connector 215 and to storage array 103. Thus, as explained above, controllers 121 and 122 control storage array 103 through the expander 213 provided by the ESM within enclosure 110. Storage array 103 in this example is not implemented on circuit board 101, but is instead implemented on a different circuit board in communication with midplane connector 215. Glue logic for the ESM is provided in this example by FPGA 216, which provides less processing power than does CPU 210.

Figure 3:
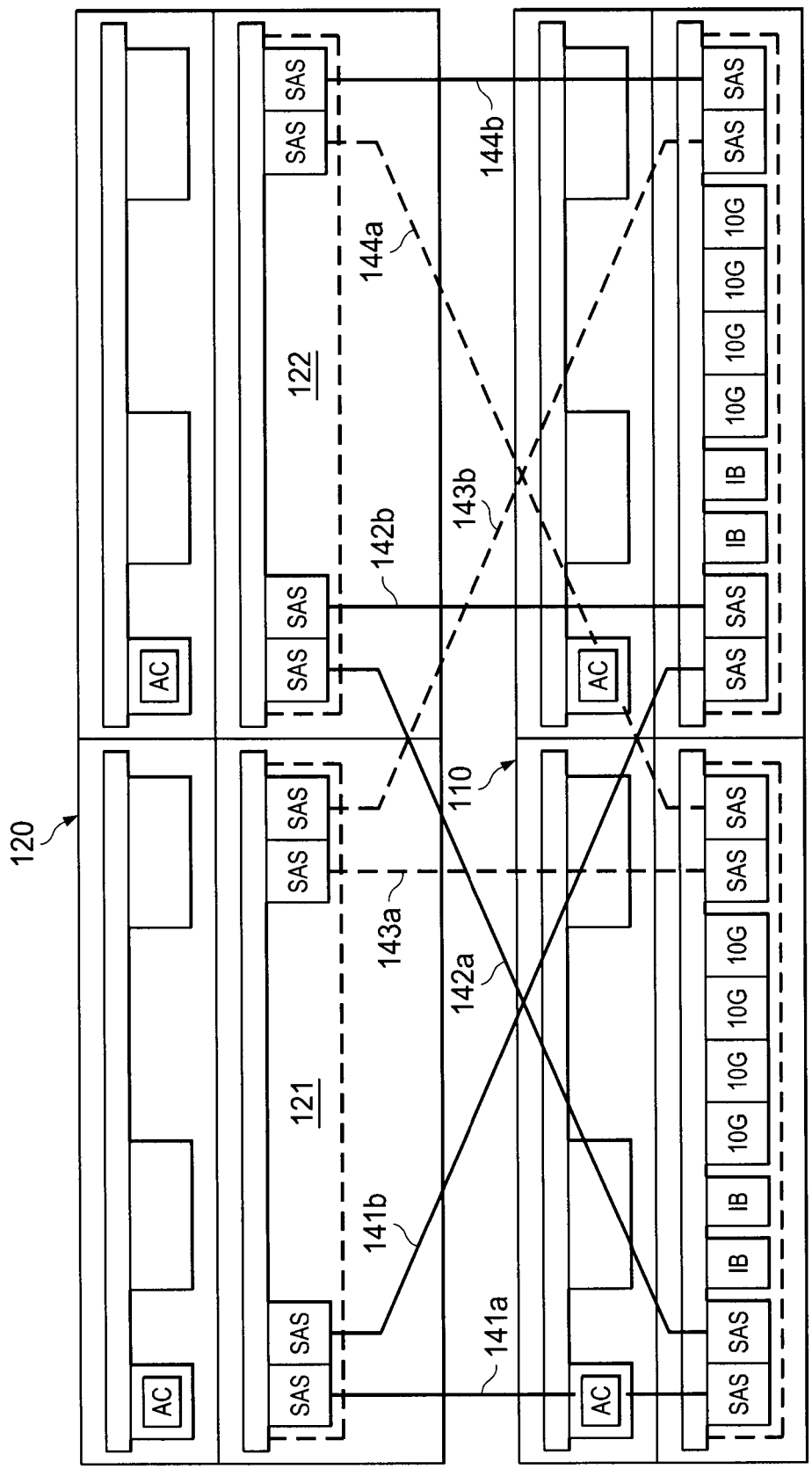
FIG. 3 is an illustration of an example mechanical and cabling diagram for the system of FIG. 1.

FIG. 3 is an illustration of an example mechanical and cabling diagram for the system of FIG. 1. Enclosures 110 and 120 are shown as standard 2 U rack-mounted enclosures. FIG. 3 also shows communication links 141-144 with respective SAS ports, and this arrangement is consistent with the communication link layout shown in FIG. 1. Ports labeled "IB" are Infiniband ports, and ports labeled 10G are Ethernet ports. The boxes labeled "AC" are example power supply units. It is noted that in practice a rack mounted enclosure may have different types and numbers of ports than those shown in FIG. 3. Also, as noted above, the scope of embodiments is not limited to SAS communication links, as other embodiments may use Ethernet, Infiniband, IEEE 802.11, and/or Fiber Channel. The example of FIG. 3 is consistent with the example of FIG. 2 in that the ASN is built using modified RAID controller hardware. However, the scope of embodiments is not limited to using RAID controller hardware in the ASNs.

Figure 4:
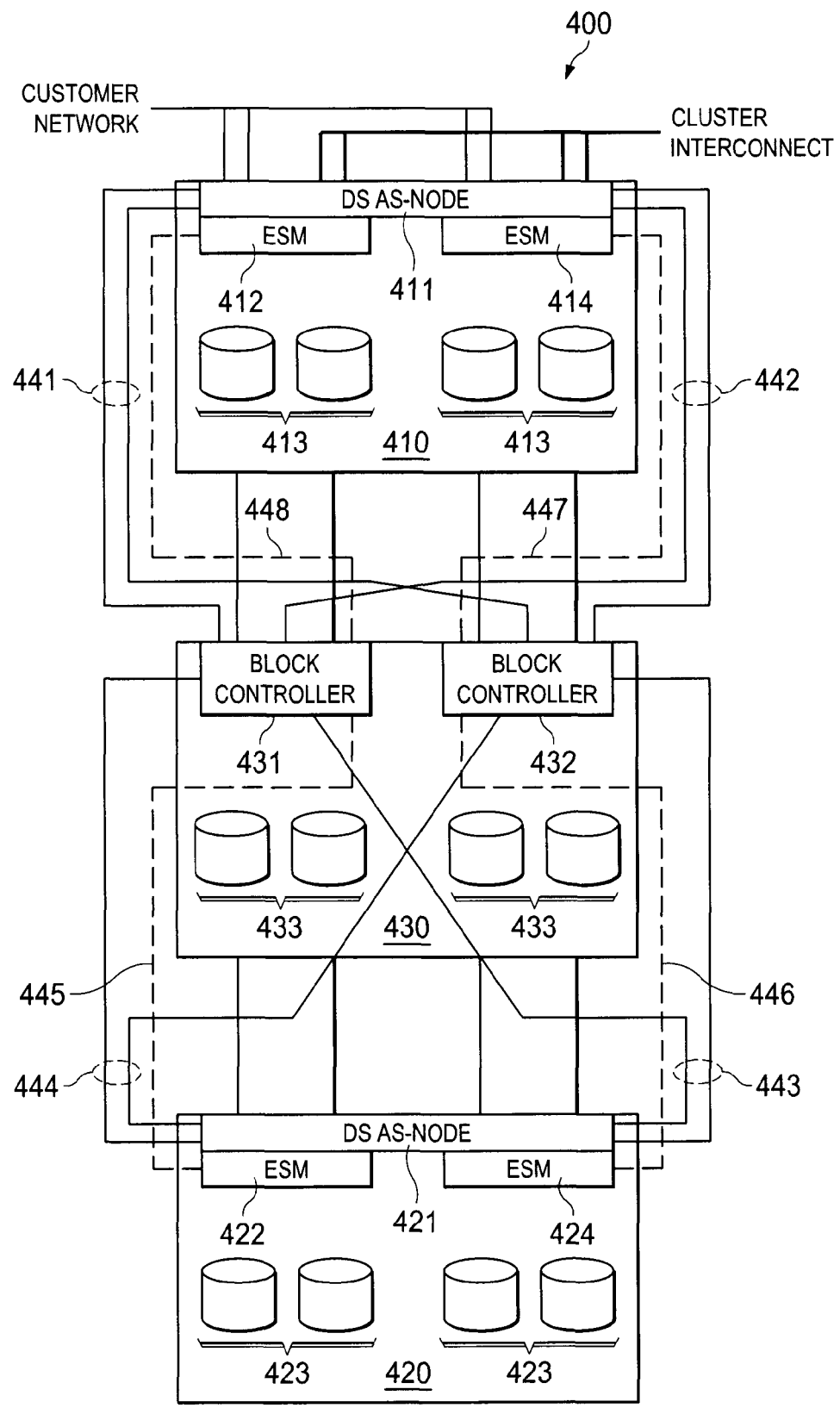
FIG. 4 is a system diagram of a computing infrastructure including a network storage system according to one embodiment.

FIG. 4 is a system diagram of a computing infrastructure 400 including a network storage system according to aspects of the present disclosure. The embodiment of FIG. 4 utilizes dense servers for ASNs and, therefore, utilizes one dense server per enclosure. As explained above, a dense server may include more processors and memory than the ASNs shown in FIG. 1 and may utilize more space within a given enclosure. For instance, enclosure 410 includes a circuit board including a dense server ASN 411 and two ESMs 412, 414. Similarly, enclosure 420 includes a dense server ASN 421 and ESMs 422, 424. ASNs 411 and 421 are configured as a HA pair via the cluster interconnect and are both connected to hosts (not shown) via the customer network. Each enclosure 410, 420 also includes a storage drive array 413 and 423, respectively. ASNs 411 and 421 run a storage warehousing application or other application on top of an operating system, similar to that described above with respect to the ASNs of FIG. 1. However, ASNs 411 and 421 may handle more concurrent processes due to their increased processing power.

Enclosure 430 includes two block controllers 431 and 432 and a storage drive array 433. Controllers 431 and 432 of FIG. 4 operate substantially similarly to controllers 121 and 122 of FIG. 1 by providing low-level virtual storage control to storage drives 413, 423, and 433.

ASN 411 has redundant communication links 441 and 442 to each of block controllers 431 and 432. Similarly, ASN 421 has redundant communication links 443, 444 to each of block controllers 431 and 432. Such communication links may be substantially similar to links 141 and 142 of FIG. 1.

Each ESM 412, 414, 422, 424 has a respective communication link 445-448 to a particular block controller 431, 432, as shown. Communication links 445-448 are substantially similar to the communication links 143, 144 of FIG. 1. Controller 431 communicates with, and controls, storage arrays 413 and 423 via respective ESMs 412 and 422. Similarly, block controller 432 communicates with, and controls, storage arrays 413 and 423 via respective ESMs 414 and 424.

Figure 5:
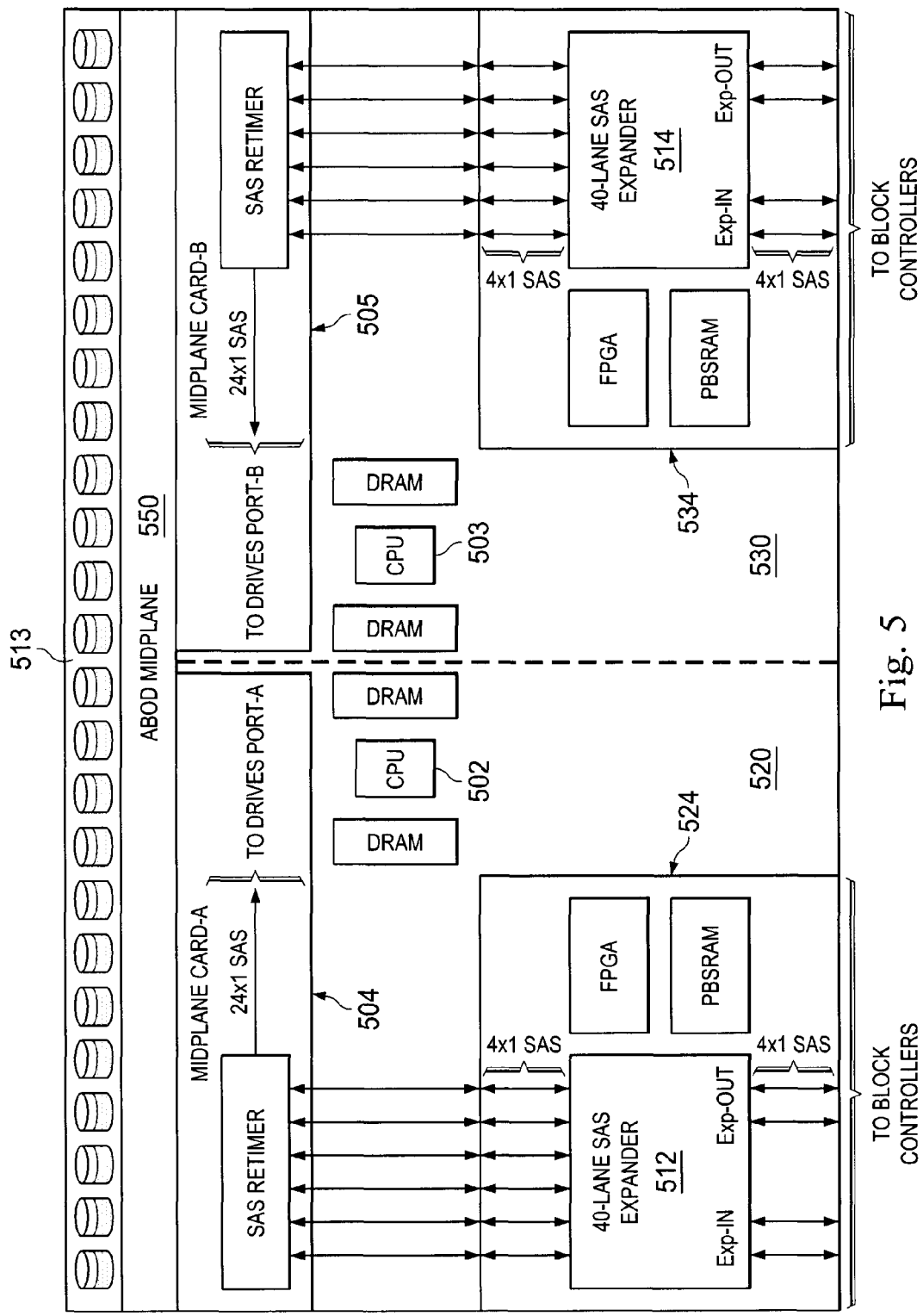
FIG. 5 is an illustration of an example circuit board, adapted according to the embodiment of FIG. 4 to include a dense server ASN and ESMs.

FIG. 5 is an illustration of two example ASNs 520 and 530, adapted according to the embodiments herein. Each ASN 520, 530 is included in its own circuit board within its own enclosure and is in communication with midplane 550 through midplane cards 505, 505. ASNs 520 and 530 are provided in contrast to the circuit board of FIG. 2, which includes RAID controller hardware. ASN 520 includes CPU 502, and ASN 530 includes CPU 503, though the scope of embodiments may include any number of CPUs in each of the ASNs. FIG. 5 illustrates one example configuration to accommodate ESMs 524 and 534 in a same enclosure with respective ASNs 520 and 530.

Each ASN 520, 530 includes its respective ESMs 524 and 534 as PCIe cards, though various embodiments may implement the hardware of ESMs 524 and 534 in any appropriate manner. ESM 524 communicates with block controllers (not shown) and passes that communication to midplane card 504 and to storage array 513. Similarly, ESM 534 communicates with block controllers (not shown) and passes that communication to midplane card 505 and on to storage array 513. Each ESM 524 and 534 has a respective expander 512, 514 to provide communication links to the controllers. In some instances, PCI is used for providing power only, while the data connections between a server and an ESM are provided by technologies other than PCI.

In one example, both ASNs 520, 530 may be implemented side-by-side in 2 U so that the total rack unit space occupied thereby is 2 U, though the scope of embodiments includes any sizes for enclosures ASNs 520, 530.

With respect to the embodiment of FIG. 4, each ASN 411, 421 may be implemented similarly to ASN 520 but with at least one more CPU and two ESMs in each ASN. With respect to the embodiments of FIGS. 1, 6, and 7, each ASN enclosure therein (e.g., enclosure 110) may be implemented using the system shown in FIG. 5 in which the ASNs 520, 530 are in a HA pair and may be optionally cross-coupled.

Figure 6:
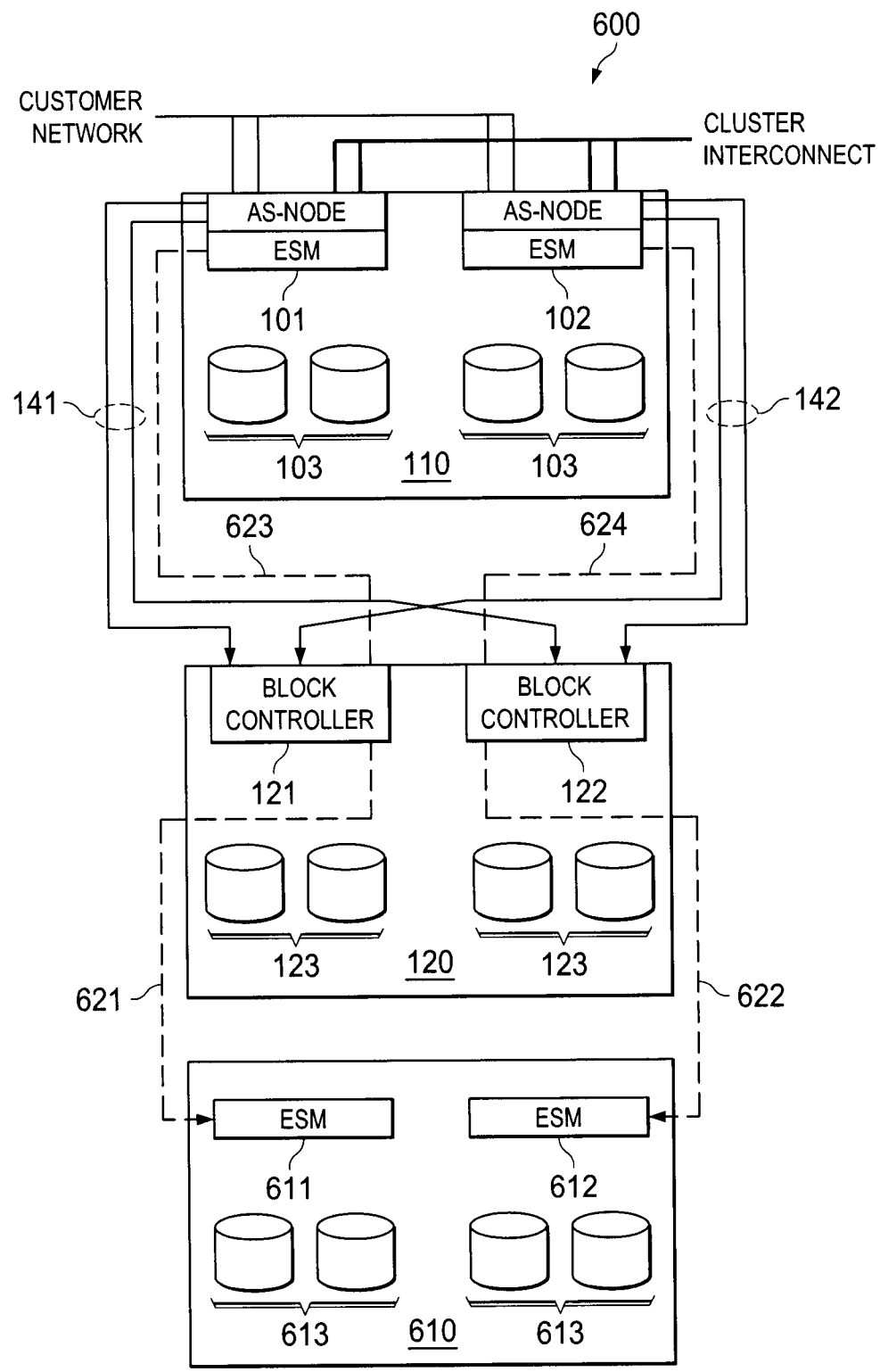
FIG. 6 is a system diagram of a computing infrastructure including a network storage system according to aspects of the present disclosure.

FIG. 6 is a system diagram of a computing infrastructure 600 including a network storage system according to aspects of the present disclosure. FIG. 6 includes many of the same features shown in FIG. 1, and like features are shown with like reference numbers.

System 600 includes enclosure 110 that has ASNs configured as a HA pair. Block controller 121 communicates with, and controls, storage array 103 via communication link 623 and the ESM of circuit board 101. Similarly, block controller 122 communicates with, and controls, storage array 103 via communication link 624 and the ESM of circuit board 102.

System 600 also includes enclosure 610. Enclosure 610 has ESMs 611 and 612 as well as storage array 613. Each of ESMs 611 and 612 has a respective expander that provides communication ports to provide communication with block controllers 121 and 122 via communication links 621, 622.

Block controller 121 communicates with, and controls, storage array 613 via communication link 621 and ESM 611. Block controller 122 communicates with, and controls, storage array 613 via communication link 622 and ESM 612. The embodiment of FIG. 6 illustrates that additional storage arrays (e.g., array 613) may be added using expanders as long as the block controllers of the system have adequate communication ports and processing power. Communication links 621-624 may include any appropriate type of communication link, including but not limited to SAS, Fibre Channel, Infiniband, Ethernet, IEEE 802.11, and the like.

Figure 7:
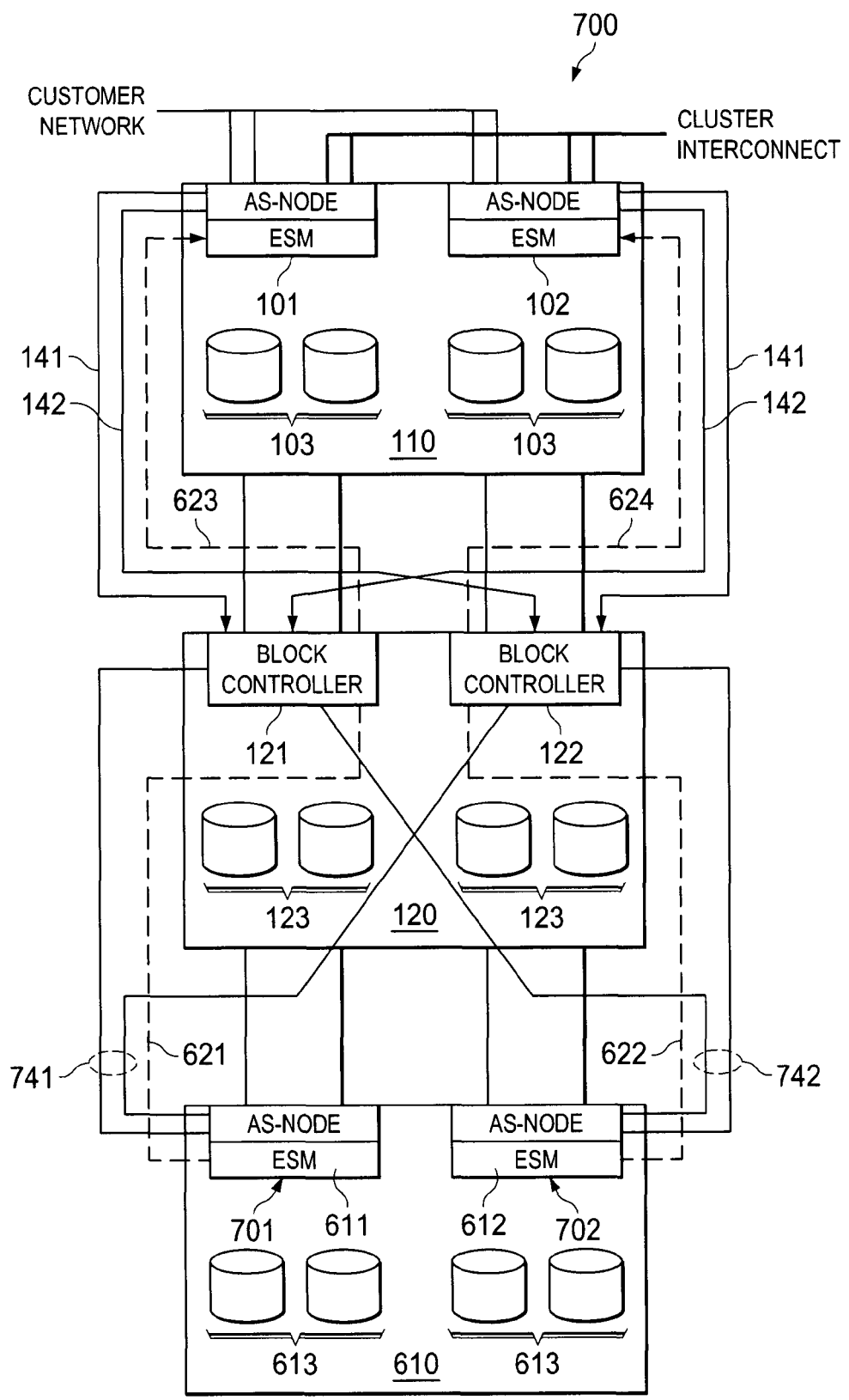
FIG. 7 is a system diagram of a computing infrastructure including a network storage system according to aspects of the present disclosure.

FIG. 7 is a system diagram of a computing infrastructure 700 including a network storage system according to aspects of the present disclosure. FIG. 7 includes many of the same features shown in FIGS. 1 and 6, and like features are shown with like reference numbers.

The ASNs of enclosures 110 and 610 are connected to the customer network, as shown, and to each other via the cluster interconnect. In addition to the concepts shown in FIG. 6, FIG. 7 illustrates that at least four ASNs can be accommodated in two different enclosures and that storage drives in those enclosures can be communicatively coupled to controllers via ESMs with the ASNs. Put another way, the ESMs of FIG. 7 provide communication ports so that storage arrays 103 and 613 can be included in the same enclosures as ASNs all while using external controllers.

The embodiment shown in FIG. 7 is similar to the embodiment shown in FIG. 6, but the embodiment of FIG. 7 adds ASNs to enclosure 610. In fact, in FIG. 7, the components and functionality within enclosure 610 are substantially similar to those within enclosure 110. Thus, ESM 611 is included in circuit board 701, and ESM 612 is included in circuit board 702. Block controllers 121, 121 include redundant cross-coupling to the ASNs of circuit boards 701 and 702 via communication links 741 and 742. Once again, block controllers 121 and 122 communicate with, and control, storage array 613 through respective ESMs 611 and 612.

Figure 8:
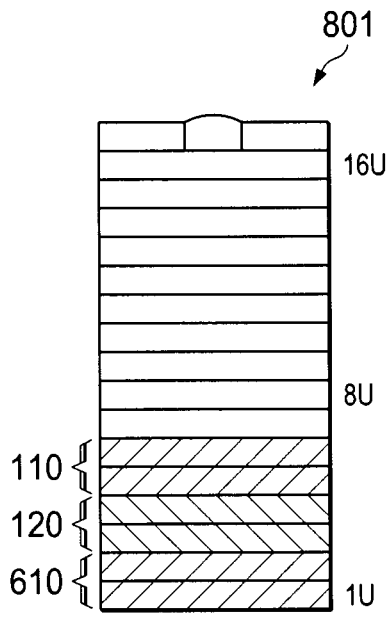
FIG. 8 is an illustration of example rack, adapted according to one embodiment.

In an exemplary embodiment, the various enclosures discussed above may be installed in a standard rack. FIG. 8 is an illustration of example rack 801, adapted according to one embodiment. In the example of FIG. 8, the system 700 (FIG. 7) has been installed in the rack 801, and each of enclosures 110, 120, 610 is embodied as a 2 U unit, thereby occupying 6 U total space.

FIG. 8 does not show other units in rack 801 for simplicity of illustration, but it is understood that the scope of embodiments includes racks with any number of enclosures therein. It is also understood that any of the embodiments of FIGS. 1, 3, 4, 6, and 7 may be configured as standard rack-mounted enclosures and installed in a rack, such as rack 810. However, the scope of embodiments is not limited to standard rack-mounted computing systems, as any appropriate configuration of enclosures (even outside of racks) may be adopted.

Figure 9:
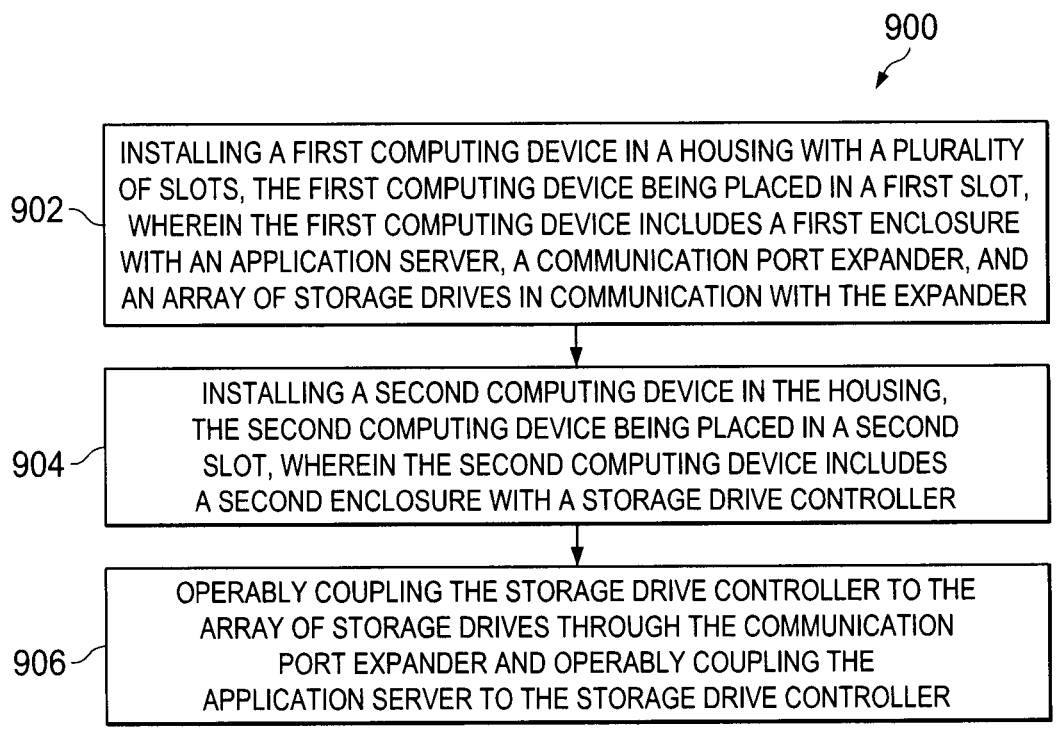
FIG. 9 is a block diagram of a method of installing a network storage system according to aspects of the present disclosure.

FIG. 9 is a block diagram of a method 900 of installing a network storage system according to aspects of the present disclosure. It is understood that additional steps can be provided before, during, and after the method 900, and some of the steps described can be replaced or eliminated for other embodiments of the method 900.

Block 902 includes installing a first computing device in a housing with a plurality of slots. An example of a suitable housing includes a EIA-310 rack with slots that are each an integer number of units tall. The first computing device is placed in a first slot of the housing, and the first computing device includes a first enclosure with an application server, a communication port expander, and an array of storage drives in communication with the expander. In one example, the enclosures of method 900 are standard enclosures that are each an integer number of rack units tall.

Block 904 includes installing a second computing device in the housing by placing the second computing device in a second slot. Further, the second computing device includes a second enclosure with a storage drive controller. In other words, the storage drive controller and the storage drive are included in separate enclosures.

Block 906 includes operably coupling the storage drive controller to the array of storage drives through the communication port expander and operably coupling the application server to the storage drive controller. The coupling of block 906 may include installing cables and, additionally or alternatively, setting up wireless communication links.

The scope of embodiments is not limited to EIA-310 standard rack housings and enclosures. Rather, various embodiments may include any appropriate housing or enclosure, whether standard or otherwise. Furthermore, the communication links among the various components may include any appropriate hardware interface and protocol. Various communication links that may be used with the embodiments herein include, but are not limited to, Ethernet, SAS, Infiniband, Fiber Channel, IEEE 802.11, and the like.

Figure 11:
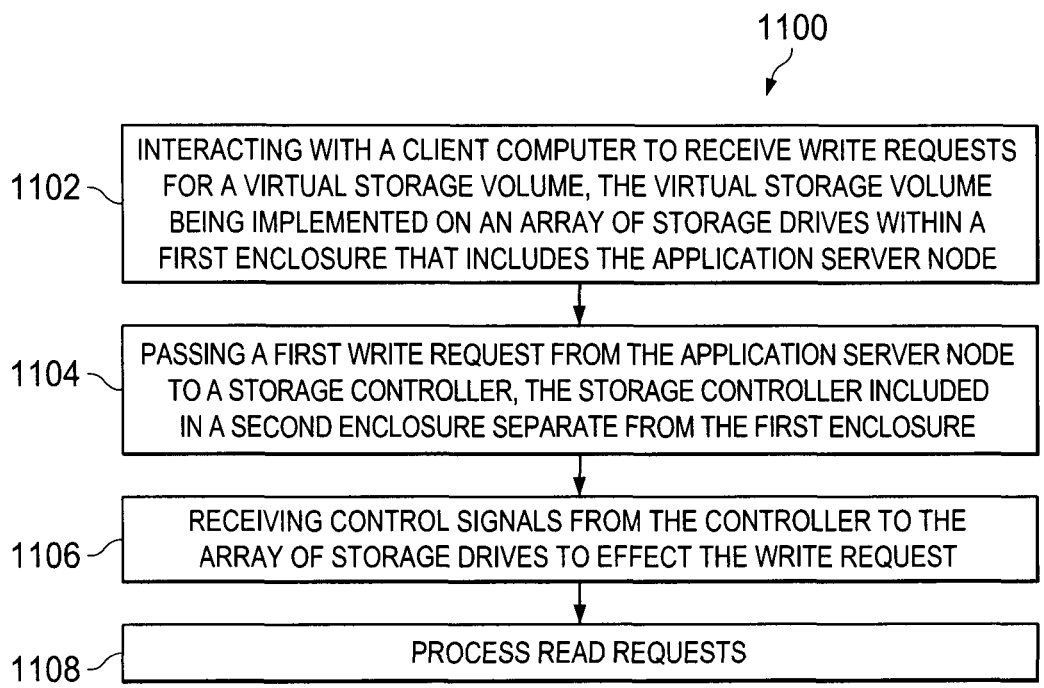
FIGS. 11 and 12 are illustrations of methods to provide virtual storage to a network storage system, according to one embodiment.

FIG. 11 is a block diagram of a method 1100 of providing virtual storage according to aspects of the present disclosure. Method 1100 is from the perspective of the hardware and software within an enclosure, such as enclosure 110 (FIG. 1). It is understood that additional steps can be provided before, during, and after the method 1100, and some of the steps described can be replaced or eliminated for other embodiments of the method 1100.

Block 1102 includes interacting with a client computer to receive write requests for a virtual storage volume. In this example, the virtual storage volume is implemented on an array of storage drives within a first enclosure that includes the application server node.

As described above, an ASN provides higher-level storage functionality, such as by implementing a map reduce system or other system. The ASN interfaces with the client computer to receive write requests and to return responses to read requests.

Further, as described above, the lower-level storage functionality, such as RAID control, is provided by the storage controller. Thus, in block 1104, the ASN passes the write request to the storage controller. Further, in this example, the storage controller is provided in an enclosure that is separate from the enclosure that includes the ASN and the storage drives.

In block 1106, physical storage drives of the array receive control signals from the storage controller to effect the write request. The control signals are received via a communication port expander located in the enclosure with the ASN and the storage array.

Method 1100 is offered to illustrate a data path that exists in various systems according to one or more embodiments. Specifically, the physical storage drives of the array are included in an enclosure that is separate from the enclosure that includes the storage controller. Therefore, write requests received at the ASN during interaction with the client are passed on to the controller in the second enclosure, and the controller then provides low-level storage control signals to the storage drives in the first enclosure. Block 1108 illustrates that read requests are effected using the same data path. There is no requirement that write requests are performed before read requests; rather, write and read requests are performed in any appropriate order.

Figure 12:
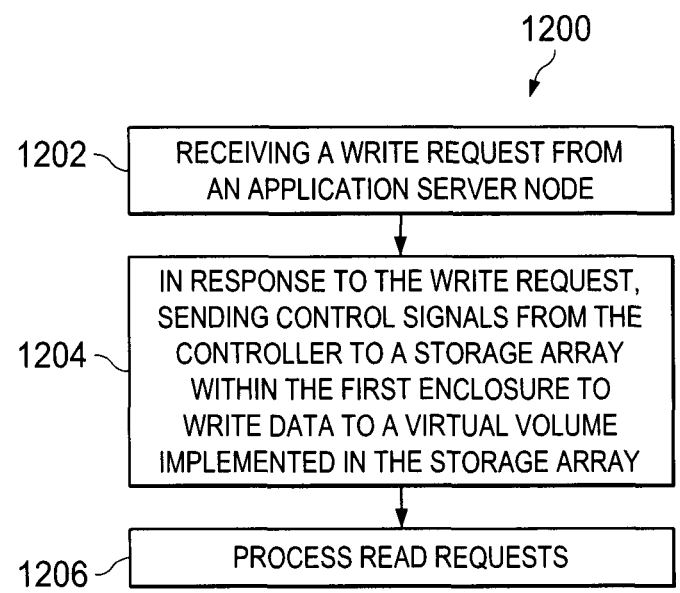

FIG. 12 is a block diagram of a method 1200 of providing virtual storage according to aspects of the present disclosure. Method 1200 is from the perspective of the hardware and software of the storage controller, such as in enclosure 120 (FIG. 1). It is understood that additional steps can be provided before, during, and after the method 1200, and some of the steps described can be replaced or eliminated for other embodiments of the method 1200.

At block 1202, the storage controller receives a write request from an ASN. In this example, the ASN performs data warehousing functionality, and the write request is in accordance with such functionality.

The write request is received via a communication port expander in a first enclosure with the ASN and is received by a storage controller in a second enclosure separate from the first enclosure. At block 1204, the block controller sends control signals from the controller to a storage array within the first enclosure to write data to a virtual volume implemented in the storage array. Such control signals are a part of the low-level storage functionality of the storage controller that provides, for example, RAID functionality in the storage drive array.

At block 1206, the block controller processes read requests in the same manner that the write request is processed in blocks 1202 and 1204. Method 1200 illustrates a data path that includes a write or read request coming from a client and being received at an ASN, then passed to a storage controller in a different enclosure. The storage controller then communicates with the physical disk drives in the ASN enclosure via a communication port expander to effect the read or write request.

For both the methods 1100 and 1200, many embodiments include storage drives in the controller's enclosure and in other enclosures as well as in the ASN enclosure. In such embodiments, the drives that are included in the same enclosure as the ASN are presented to the RAID controller via the port expander such that they become members of the total set of drives that are managed by the RAID controller. In other words, the RAID controller combines the drives in its enclosure with drives in an Expansion JBODs (EBOD) (e.g., 610 in FIG. 6, if applicable) and the drives in the ASN enclosure to create RAID volumes to be presented to the applications running on the ASN.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method for providing virtual storage for a client, the method comprising:
    receiving, at a first computing system implementing an application server node, a write request from a client computer to a virtual storage volume implemented on an array of storage drives accessible by, and physically located with, the first computing system;
    passing, by the application server node, the write request from the application server node to a storage controller, the storage controller implemented by a second computing system that is physically separate from the first computing system; and
    receiving, by an expander physically located with the first computing system, a drive access instruction from the storage controller to the array of storage drives via a communication path between the first computing system and the second computing system, the drive access instruction configured to effect the write request in response to the passing the write request to the storage controller.

2. The method of claim 1, wherein the storage controller comprises RAID controller hardware, and wherein the application server node comprises a CPU executing a data warehousing program.

3. The method of claim 1, wherein:
    the expander comprises a communication port expander that is included in an Enclosure Service Module (ESM), the ESM being physically located with the first computing system, and
    the communication port expander comprises a Serial Attached SCSI (SAS) expander.

4. A method for providing virtual storage in a storage network, the method comprising:
    receiving, at a storage controller in a first enclosure, a write request from an application server node in a second enclosure via a communication port expander in the second enclosure,
    wherein the second enclosure is separate from the first enclosure and the write request is in accordance with data warehousing functionality of the application server node; and
    sending, in response to the write request, control signals from the controller to a storage array within the second enclosure via the communication port expander to write data to a virtual volume implemented in the storage array.

5. The method of claim 4, wherein the storage controller comprises a RAID controller.

6. The method of claim 4, further comprising:
    receiving, at the storage controller, a read request from the application server; and
    sending, in response to the read request, control signals from the storage controller to the storage array via the communication port expander to read data to the virtual volume.

* * * * *